United States Patent
Oota (10) Patent No.: US 8,878,979 B2
(45) Date of Patent: Nov. 4, 2014

(54) IMAGE PICKUP APPARATUS AND FOCUS CONTROL METHOD WHICH AMPLIFY AN IMAGE IN ACCORDANCE WITH THE LUMINANCE WHEN THE LUMINANCE VARIATION EXISTS AND USE THE AMPLIFIED IMAGE IN FOCUS CONTROL

(75) Inventor: Makoto Oota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 819 days.

(21) Appl. No.: 12/128,882

(22) Filed: May 29, 2008

(65) Prior Publication Data
US 2008/0303925 A1   Dec. 11, 2008

(30) Foreign Application Priority Data

Jun. 11, 2007 (JP) ................. 2007-153506

(51) Int. Cl.
*H04N 5/232* (2006.01)
*H04N 9/73* (2006.01)
(52) U.S. Cl.
CPC ............................. *H04N 5/23212* (2013.01)
USPC ....................... 348/349; 348/226.1
(58) Field of Classification Search
USPC ............ 348/222.1, 226.1, 227.1, 229.1, 345, 348/349, 370
See application file for complete search history.

(56) References Cited

U.S. PATENT DOCUMENTS

| | | | | |
|---|---|---|---|---|
| 5,604,538 A * | 2/1997 | Kaneda et al. | ................ | 348/353 |
| 6,271,883 B1 * | 8/2001 | Iijima et al. | ................... | 348/345 |
| 7,508,443 B2 * | 3/2009 | Kato | .............................. | 348/371 |
| 7,551,222 B2 * | 6/2009 | Morofuji | ....................... | 348/345 |
| 7,636,109 B2 * | 12/2009 | Nakajima et al. | ......... | 348/226.1 |
| 8,488,051 B2 * | 7/2013 | Yokoi | ............................. | 348/349 |
| 2006/0170813 A1 * | 8/2006 | Morofuji | ...................... | 348/345 |
| 2008/0284870 A1 * | 11/2008 | Yokoi | ........................ | 348/228.1 |

FOREIGN PATENT DOCUMENTS

JP   2001-186407      7/2001
JP   2003-244519 A    8/2003

OTHER PUBLICATIONS

The above reference was cited in a Aug. 23, 2011 Japanese Office Action, which is not enclosed, that issued in Japanese Patent Application No. 2007-153506.

* cited by examiner

*Primary Examiner* — Twyler Haskins
*Assistant Examiner* — Carramah J Quiett
(74) *Attorney, Agent, or Firm* — Cowan, Liebowitz & Latman, P.C.

(57) ABSTRACT

An image pickup apparatus includes a first image generator 3 that generates a first unit image based on a signal read from the image pickup device with each read cycle of the signal, a detector 5 that detects a luminance of the first unit image and detects a luminance variation in a plurality of the first unit images, a second image generator 6 that amplifies the first unit image in accordance with the luminance to generate a second unit image if the luminance variation exists, and a controller 8 or 9 that generates a focus evaluation signal based on the second unit image to perform a focus control using the focus evaluation signal. The controller does not use the focus evaluation signal based on the second unit image generated from the first unit image in which the luminance is lower than that of a predetermined level for the focus control, and the controller uses the focus evaluation signal based on the second unit image generated from the first unit image in which the luminance is higher than that of the predetermined level for the focus control.

6 Claims, 6 Drawing Sheets

IMAGE PICKUP APPARATUS AND FOCUS CONTROL METHOD WHICH AMPLIFY AN IMAGE IN ACCORDANCE WITH THE LUMINANCE WHEN THE LUMINANCE VARIATION EXISTS AND USE THE AMPLIFIED IMAGE IN FOCUS CONTROL

BACKGROUND OF THE INVENTION

The present invention relates to an image pickup apparatus and a focus control method for performing a focus control using an image (a video) generated by using an image pickup device.

A video camera or a digital still camera that includes an image pickup device such as a CCD sensor and a CMOS sensor commonly generates a focus evaluation signal (an AF evaluated value) showing a contrast state of a video from a video signal to perform a focus control so as to maximize the AF evaluated value. That is a so-called contrast AF.

An image pickup apparatus using an image pickup device of a so-called rolling shutter method such as a CMOS sensor can read signals at a speed higher than that of a conventional apparatus (in a cycle shorter than that of a convention apparatus) and generate a unit image (a frame image, or a field image constituting the frame image) based on the signals. Therefore, the focus evaluation signal can also be generated in a cycle shorter than that of the conventional apparatus and the accuracy and the response of the focus control can be improved.

However, when an object illuminated by a light source that causes flickers such as a fluorescent light is imaged by using such an image pickup device that can read at high speed, a luminance variation in each of unit images by the flickers affects the focus evaluation signal.

Japanese Patent Laid-Open No. 2001-186407 discloses a technology for obtaining a video from which the luminance variation by the flickers of the fluorescent light has been removed. This performs a gain adjustment (an amplification) in accordance with the luminance for the unit image generated based on the signals read from the image pickup device. Thus, a video with a small luminance variation can be obtained. Japanese Patent Laid-Open No. 2001-186407, however, does not consider the focus control (a contrast AF).

If the focus control signal is generated from the video signal from which the luminance variation has been reduced by the technology disclosed in Japanese Patent Laid-Open No. 2001-186407, the effect of the luminance variation for the focus control signal might be able to be reduced.

However, as described above, the gain adjustment has been performed for the unit image that is a base for generating the focus control signal. The gain adjusted image commonly declines in an S/N ratio. The focus evaluation signal generated based on the unit image with a low S/N ratio frequently has errors. If such a focus evaluation signal is used, a fine contrast AF cannot be performed.

BRIEF SUMMARY OF THE INVENTION

The present invention provides an image pickup apparatus and a focus control method that can perform a fine focus control even if a luminance variation exists.

An image pickup apparatus as one aspect of the present invention includes an image pickup device that photoelectrically converts an object image, a first image generator that generates a first unit image based on a signal read from the image pickup device with each read cycle of the signal, a detector that detects a luminance of the first unit image and detects a luminance variation in a plurality of the first unit images, a second image generator that amplifies the first unit image in accordance with the luminance to generate a second unit image if the luminance variation exists, and a controller that generates a focus evaluation signal based on the second unit image to perform a focus control using the focus evaluation signal. The controller does not use the focus evaluation signal based on the second unit image generated from the first unit image in which the luminance is lower than that of a predetermined level for the focus control, and the controller uses the focus evaluation signal based on the second unit image generated from the first unit image in which the luminance is higher than that of the predetermined level for the focus control.

A focus control method as another aspect of the present invention includes a first image generation step that generates a first unit image based on a signal read from an image pickup device photoelectrically converting an object image in each read cycle of the signal, a detection step that detects a luminance of the first unit image and that detects a luminance variation in a plurality of the first unit images, a second image generation step that amplifies the first unit image in accordance with the luminance to generate a second unit image if the luminance variation exists, and a control step that generates a focus evaluation signal based on the second unit image to perform a focus control using the focus evaluation signal. The control step does not use the focus evaluation signal based on the second unit image generated from the first unit image in which the luminance is lower than that of a predetermined level for the focus control, and the controller uses the focus evaluation signal based on the second unit image generated from the first unit image in which the luminance is higher than that of the predetermined level for the focus control.

Other aspects of the present invention will be apparent from the embodiments described below with reference to the drawings.

DETAILED DESCRIPTION OF THE PREFERRED EMBODIMENTS

Exemplary embodiments of the present invention will be described below with reference to the accompanied drawings.

Embodiment 1

Figure 1:
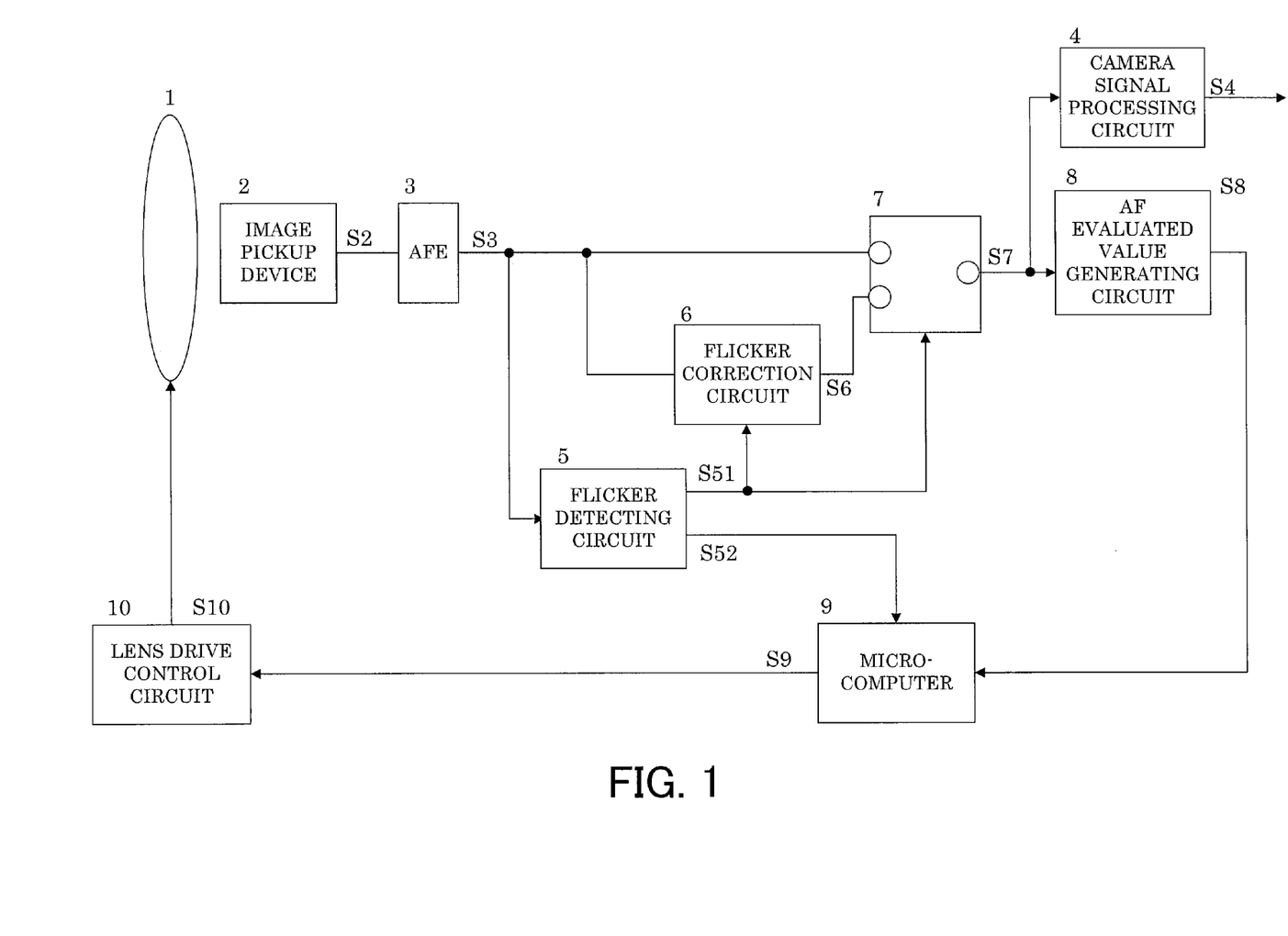
FIG. 1 is a block diagram showing the configuration of an image pickup apparatus that is Embodiment 1 of the present invention.

FIG. 1 shows the configuration of an image pickup apparatus that is Embodiment 1 of the present invention.

An image pickup lens 1 forms an object image on an image pickup device 2. The image pickup lens 1 includes a focus lens (not shown). The focus lens moves in a direction of the optical axis in accordance with an output signal S10 of a lens drive control circuit 10 that is controlled by a control signal from a microcomputer 9 in order to focus on the object.

The image pickup device 2 is an optical conversion device such as a CMOS sensor. It photoelectrically converts the object image to output an analog image signal in accordance with the luminance. The image pickup device 2 can read signals at high speed of 500 unit images/sec, for example.

The analog image signal outputted from the image pickup device 2 is converted to a digital image signal by an A/D converter (not shown) provided in an AFE (an analog front end) 3. This digital signal is referred to as a first unit image in the present embodiment. It is outputted from the AFE 3 as an output signal S3. The AFE 3 corresponds to a first image generator.

The "unit image" in this embodiment means one image that is generated in each read cycle of the image pickup device 2. It is different from a frame image or a field image represented as 30 frame images/sec or 60 field images/sec constituting an output video by the NTSC system. However, 30 unit images among 500 unit images generated in one second after predetermined signal processing constitute each of field images in the NTSC system, and two field images constitute the frame image.

The read cycle of signals from the image pickup device 2 does not have to be the cycle (1/500 sec) corresponding to 500 unit images/sec. It has only to be shorter than a flicker cycle (for example, 1/50 sec) of a fluorescent light as described later.

A flicker detecting circuit (a detector) 5 detects the luminance of an output signal S3 (a first unit image) that is sequentially inputted from the AFE 3. It also detects the luminance variation (hereinafter also referred to as "the flicker") caused by the flicker of the light source such as the fluorescent light generated in a plurality of the first unit images. The method for detecting the luminance of the first unit image and the existence of the flicker will be described later.

When the flicker exists, the flicker detecting circuit 5 calculates a gain for performing an amplification process for the first unit image to correct the flicker, and output the gain as an output signal S51. When the flicker exists, the value of the gain is 1 or more. When the flicker does not exist, the flicker detecting circuit 5 outputs 0 as the output signal S51. The gain calculation method for correcting the flicker will be described later.

The flicker detecting circuit 5, in accordance with the gain for the first unit image, outputs use/nonuse information showing whether a focus evaluation signal based on the second unit image generated by the amplification process for the first unit image is used or not as an output signal S52.

In general, the focus evaluation signal is also referred to as an AF evaluated value signal. The focus lens position at which the AF evaluated value is maximized is regarded as an in-focus position. Therefore, the in-focus position of the object can be obtained by moving the focus lens so as to maximize the AF evaluated value.

Figure 2:
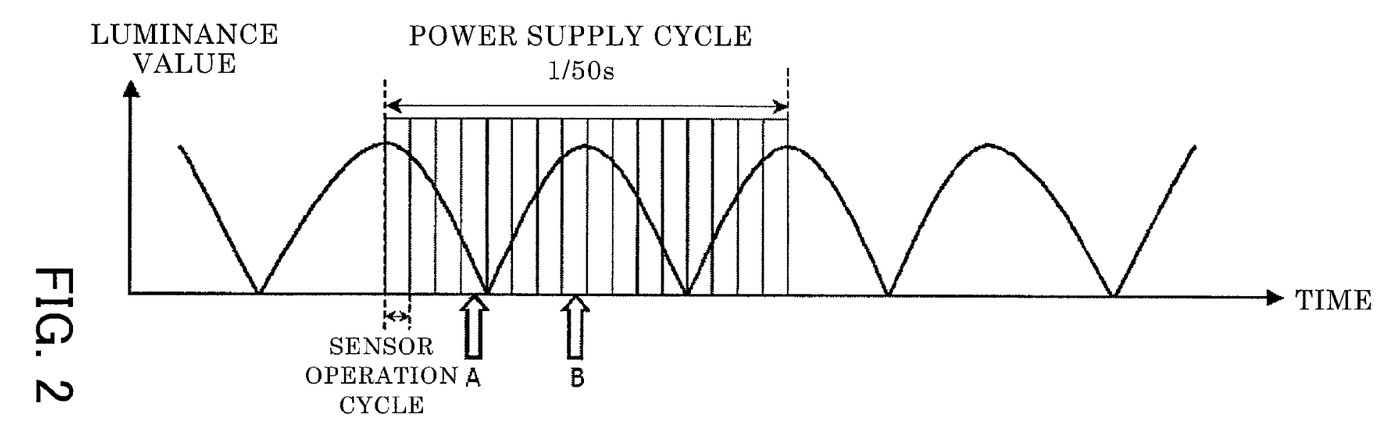
FIG. 2 is a diagram showing the relationship between the flickers of a fluorescent light and the operation cycle of a sensor.

When the gain is smaller than a predetermined value that is larger than 1, in other words, the luminance of the first unit image is higher than a predetermined level, the flicker detecting circuit 5 determines to use the focus evaluation signal (hereinafter referred to as "the AF evaluated value signal") in the focus control. As the first unit image in which the luminance is higher than the predetermined level, FIG. 2 shows the first unit image generated at the time represented as B. When the gain is larger than the predetermined value, in other words, the luminance of the first unit image is lower than the predetermined level, the flicker detecting circuit 5 determines not to use the AF evaluated value signal in the focus control. As the first unit image in which the luminance is lower than the predetermined level, FIG. 2 shows the first unit image generated at the time represented as A.

When the flicker detecting circuit 5 uses the AF evaluated value signal in the focus control, it outputs 1 as the output signal S52 representing the use/nonuse information. On the other hand, when the flicker detecting circuit 5 does not use the AF evaluated value signal in the focus control, it outputs 0 as the output signal S52 representing the use/nonuse information. When the flicker does not exist, the flicker detecting circuit 5 outputs 1 as the use/nonuse information.

A flicker correction circuit 6 amplifies the first unit image outputted as the output signal S3 from the AFE 3 by multiplying the gain shown by the output signal S51 from the flicker detecting circuit 5 to generate the second unit image as a digital image signal in which the flicker has been corrected. The flicker correction circuit 6 outputs the generated second unit image as an output signal S6. The flicker correction circuit 6 corresponds to a second image generator. When the gain is 1, in practice, the second unit image is outputted without the amplification of the first unit image. In this embodiment, however, the above case is regarded as the amplification process in which the gain is 1.

When the output signal S51 from the flicker detecting circuit 5 is 0, in other words, the flicker does not exist, a selector 7 outputs the first unit image outputted as the output signal S3 from the AFE 3 as a output signal S7. On the other hand, when the output signal S51 is not 0 (the gain is 1 or more) from the flicker detecting circuit 5, the selector 7 outputs the second unit image after correcting the flicker outputted as the output signal S6 from the flicker correction circuit 6 as an output signal S7.

A camera signal processing circuit 4 performs various kinds of signal processing such as an aperture correction, a gumma correction, and a white balance for the first or second unit image as the output signal S7 from the selector 7 to generate the field image (or the frame image) constituting the output video as described above. The output video is outputted from the camera signal processing circuit 4 as an output signal S4 to be shown on a display (not shown) or to be recorded on a recording media (not shown).

An AF evaluated value generating circuit 8 generates the AF evaluated value signal based on the first unit image (if the flicker does not exist) or the second unit image (if the flicker exists) inputted from the selector 7 as the output signal S7 to output it as an output signal S8. Specifically, the AF evaluated value generating circuit 8 generates the AF evaluation signal by extracting the high-frequency component of the output signal S7 using a band-pass filter.

When the use/nonuse information that is the output signal S52 from the flicker detecting circuit 5 is 1, the microcomputer 9 performs the focus control using the AF evaluated value signal (an output signal S8) based on the second unit image corresponding to the use/nonuse information. In this case, the microcomputer 9 outputs the control signal that is used for moving the focus lens as an output signal S9 to the lens drive control circuit 10. On the other hand, when the use/nonuse information is 0, the microcomputer 9 does not use the AF evaluated value signal (the output signal S8) based on the second unit image corresponding to the use/nonuse information for the focus control.

The microcomputer 9 and the AF evaluated value generating circuit 8 constitute a controller.

Next, a method for detecting the luminance and the flicker by the flicker detecting circuit 5 will be explained.

The flicker detecting circuit 5 takes the average of the luminance value in the whole area or the predetermined area of the first unit image that is the output signal S3 of the AFE 3 to regard it as the luminance of the first unit image.

The flicker detecting circuit 5 detects whether or not the flicker exists by comparing the luminance of the plurality of the first unit images sequentially obtained as described above.

Specifically, as shown in FIG. 2, the flicker detecting circuit 5 obtains the maximum value and the minimum value from the luminances of the plurality of the first unit images included in a cycle corresponding to the power supply frequency of the light source, in other words, $1/50$ sec that is the flicker cycle of the fluorescent light. The flicker cycle of the fluorescent light is longer than the read cycle of the signals from the image pickup device 2.

When the difference between the maximum value and the minimum value that have been obtained above is larger than a predetermined value, the flicker detecting circuit 5 determines that the flicker probably exists. On the other hand, when the difference is smaller than the predetermined value, the flicker detecting circuit 5 determines that the flicker does not exist.

Furthermore, when the flicker detecting circuit 5 determines that the flicker probably exists, it detects the luminance of the first unit image generated $1/100$ sec after the first unit image for which the luminance of the maximum value has been obtained, and compares the maximum value with the luminance of the first unit image generated after $1/100$ sec. When the luminance of the maximum value is the same as that of the first unit image generated after $1/100$ sec (or the difference is small enough to be regarded as substantially the same luminance), the flicker detecting circuit 5 determines that the flicker exists. The flicker detecting circuit 5 can repeat the comparison between the maximum value and the luminance of the first unit image generated $1/100$ sec later predetermined times to determine that the flicker exists when the luminance is the same every time.

Next, the method for calculating the gain used for the flicker correction will be explained. When the flicker detecting circuit 5 determines that the flicker exists, it performs an integral processing of the luminance of the plurality of the first unit image. The number of the first unit images for which the integral processing is performed is the number corresponding to the least common multiple of the power supply frequency and the read frequency (the sensor operating frequency) of the signals from the image pickup device 2. This is to match the number of the first unit images for which the integral of the luminance is performed and the flicker cycle of the fluorescent light.

The flicker detecting circuit 5 can start the integral processing of the luminance at the time of detecting the flicker and can also perform it with resetting in a cycle corresponding to the frequency of the least common multiple of the power supply frequency and the sensor operating frequency.

After performing the integral processing of the luminance, the flicker detecting circuit 5 divides the obtained integrated value by the number of the first unit images at which the luminance integral has been performed to obtain the luminance average of the plurality of the first unit images. The flicker detecting circuit 5 obtains the ratio of the average luminance value and the average value of the luminance of each of the first unit images. The ratio corresponds to a gain for correcting the flicker and is outputted as an output signal S51.

The average luminance value can be updated in every cycle in which the integral is performed, or the same average luminance value can be continuously used until the flicker is not detected.

The method for detecting the luminance and the flicker explained above is just one example, another method can also be used.

The flicker detecting circuit 5 described above determines the use/nonuse information based on whether or not the gain for correcting the flicker is smaller than the predetermined value. Alternatively, the flicker detecting circuit 5 can also determine the use/nonuse information based on whether or not the luminance of the first unit image is higher than a predetermined level.

Next, the processing of the focus control (an AF control) performed by the microcomputer 9 will be explained in detail.

As described above, the microcomputer 9 performs calculations regarding the movement control of the focus lens using the use/nonuse information that is the output signal S52 of the flicker detecting circuit 5 and the AF evaluated value signal that is the output signal S8 from the AF evaluated value generating circuit 8 to output the control signal.

Figure 3:
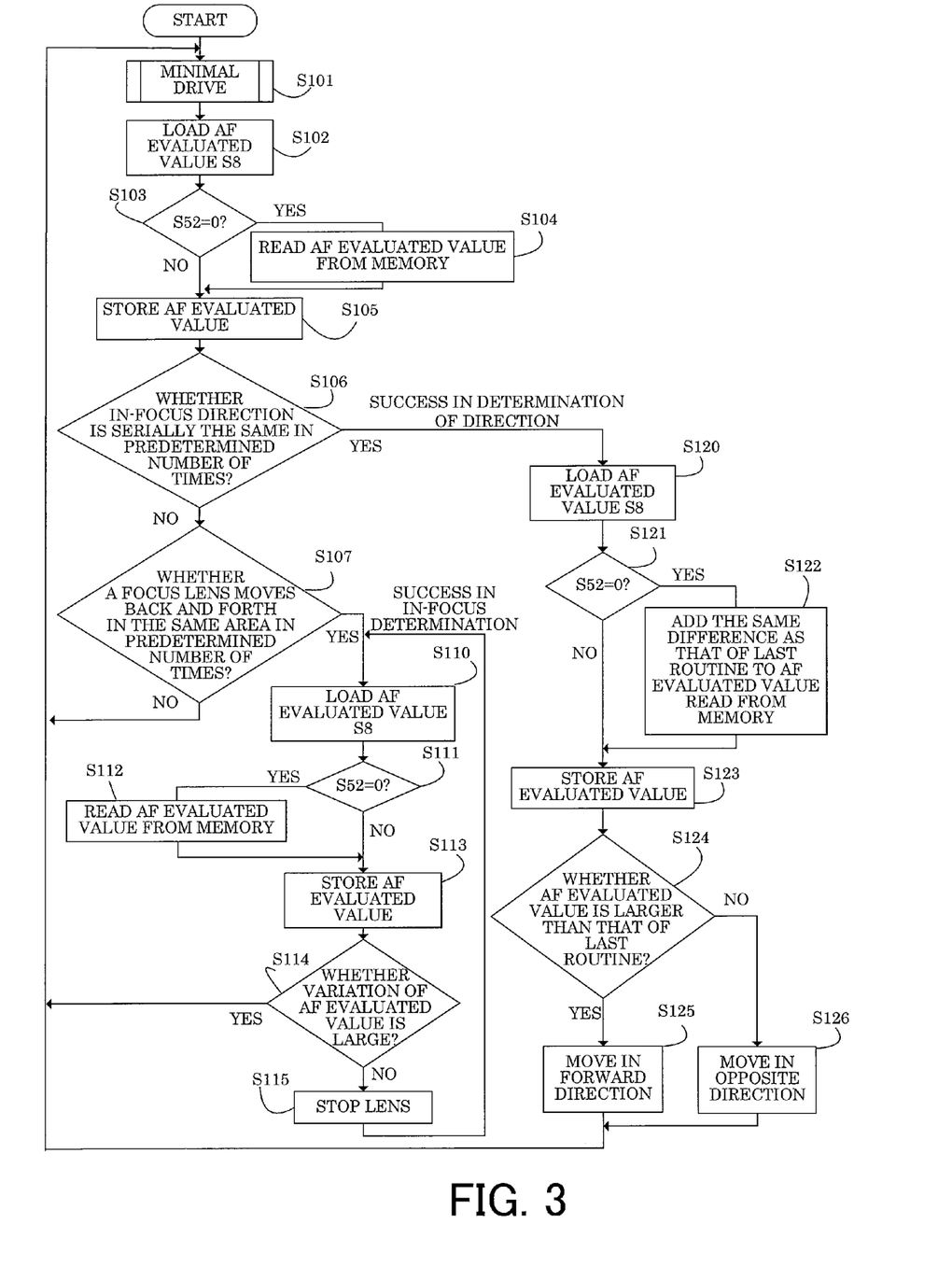
FIG. 3 is a flowchart of the AF control in a control apparatus of Embodiment 1.

FIG. 3 shows a flowchart of the AF control in the microcomputer 9.

First, at Step S101, the microcomputer 9 controls the focus lens provided inside the image pickup lens 1 to drive it minimally back and forth (hereinafter referred to as "a minimal drive control"). The AF evaluated value generating circuit 8 sequentially generates the AF evaluated value signal based on the first or second unit image.

Next, at Step S102, the microcomputer 9 loads the AF evaluated value signal S8.

At Step S103, the microcomputer 9 determines whether or not the use/nonuse information S52 from the flicker detecting circuit 5 is 0. When the use/nonuse information S52 is 0, it means that the gain for correcting the flicker used for generating the second unit image that was a base of the AF evaluated value signal S8 loaded at Step S103 is larger than the predetermined value and that the second unit image has a low S/N ratio. Therefore, in this case, proceeding to Step S104, the microcomputer 9 reads the AF evaluated value stored in a memory (not shown) in the last routine. At Step S105, the microcomputer 9 stores the AF evaluated value in the last routine in the memory as the AF evaluated value in the current routine. In other words, the microcomputer 9 does not use the AF evaluated value signal S8 loaded at Step 103 that is the current routine.

On the other hand, when the use/nonuse information S52 from the flicker detecting circuit 5 is 1, it means that the gain for correcting the flicker used for generating the second unit image that was a base of the AF evaluated value signal S8 is smaller than the predetermined value and that the second unit image has a high S/N ratio. Therefore, directly proceeding to Step S105, the microcomputer 9 stores the AF evaluated value that is represented by the AF evaluated value signal S8 loaded at Step 103 that is the current routine in the memory as the AF evaluated value in the current routine. In other words, the microcomputer 9 uses the AF evaluated value signal S8 loaded at Step 103 that is the current routine.

Next, at Step S106, the microcomputer 9 determines whether or not the directions that have been determined as an in-focus direction are the same sequentially in the routines of predetermined number of times. This step determines whether or not the microcomputer 9 has succeeded in determining the in-focus direction. The in-focus direction is a direction of the in-focus position with respect to the position of the current focus lens. The in-focus direction is determined by the fact that the AF evaluated value continues to increase in the routines of the predetermined number of times. If the directions determined as the in-focus direction are the same in the predetermined number of times, in other words, if the microcomputer 9 has succeeded in determining the in-focus direction, the microcomputer 9 proceeds to Step S120 to perform "a climbing control". If not, the microcomputer 9 proceeds to Step S107.

At Step S107, the microcomputer 9 determines whether or not the focus lens moves back and forth inside the same area in the routines of the predetermined number of times. This step determines whether or not the microcomputer 9 has succeeded in the in-focus determination. Moving back and forth inside the same area means that the AF evaluated value alternately repeats the increase and the decrease with respect to the maximum value and that the focus lens is positioned roughly at the in-focus position. In other words, it means that the microcomputer 9 has succeeded in the in-focus determination. If the focus lens moves back and forth inside the same area in the routines of the predetermined number of times (the microcomputer 9 has succeeded in the in-focus determination), the microcomputer 9 proceeds to Step S110. If not, the microcomputer 9 returns to Step S101 to perform "the minimal drive control".

In "the climbing control", the microcomputer 9 loads the AF evaluated value signal S8 from the AF evaluated value generating circuit 8 at Step S120.

At Step S121, the microcomputer 9 determines whether or not the use/nonuse information S52 from the flicker detecting circuit 5 is 0. When the use/nonuse information S52 is 0, as described above, it means that the gain for correcting the flicker used for generating the second unit image that was a base of the AF evaluated value signal S8 is larger than the predetermined value and that the second unit image has a low S/N ratio. In this case, proceeding to Step S122, the microcomputer 9 reads the AF evaluated value obtained in the past two routines. Then, the microcomputer 9 adds the difference value between the second last AF evaluated value and the last AF evaluated value to the last AF evaluated value. At Step S123, the microcomputer 9 stores the added result in the memory as the AF evaluated value in the current routine. In other words, the microcomputer 9 does not use the AF evaluated value signal S8 loaded at Step S120 in the current routine.

On the other hand, when the use/nonuse information S52 is 1, as described above, it means that the gain for correcting the flicker used for generating the second unit image that was a base of the AF evaluated value signal S8 is smaller than the predetermined value and that the second unit image has a high S/N ratio. Therefore, the microcomputer 9 directly proceeds to Step S123, and the AF evaluated value represented by the AF evaluated value signal S8 loaded at Step 120 in the current routine in the memory as the AF evaluated value in the current routine. In other words, the microcomputer 9 uses the AF evaluated value signal S8 loaded at Step S120 in the current routine.

Next, at Step S124, the microcomputer 9 determines whether or not the AF evaluated value in the current routine stored at Step S123 is larger than that in the last routine. If the AF evaluated value in the current routine is larger than that in the last routine, it means that the focus lens is moving in the in-focus direction. Therefore, the microcomputer 9 outputs a control signal for moving the focus lens predetermined amount in the same direction as that of the last routine (in the forward direction) as the output signal S9. On the other hand, if the AF evaluated value in the current routine is smaller than that in the last routine, it means that the focus lens is moving in the direction opposite to the in-focus direction. Therefore, the microcomputer 9 outputs a control signal for moving the focus lens predetermined amount in the direction opposite to the direction in the last routine as the output signal S9.

Then, the microcomputer 9 returns to Step S101 to perform "the minimal drive control".

At Step S110, the microcomputer 9 loads the AF evaluated value signal S8 from the AF evaluated value generating circuit 8.

At Step S111, the microcomputer 9 determines whether or not the use/nonuse information S52 from the flicker detecting circuit 5 is 0. When the use/nonuse information S52 is 0, as described above, the second unit image that was a base of the AF evaluated value signal S8 has a low S/N ratio. Therefore, proceeding to Step S112, the microcomputer 9 reads the AF evaluated value obtained in the last routine from the memory. Then, the microcomputer 9 stores the AF evaluated value in the last routine in the memory as the AF evaluated value in the current routine. In other words, the microcomputer 9 does not use the AF evaluated value signal S8 loaded at Step S110 in the current routine.

When the use/nonuse information S52 is 1, as described above, the second unit image that was a base of the AF evaluated value signal S8 has a high S/N ratio. Therefore, proceeding directly to Step S113, the microcomputer 9 stores the AF evaluated value represented by the AF evaluated value signal S8 loaded at Step S110 of the current routine in the memory as the AF evaluated value in the current routine. In other words, the microcomputer 9 uses the AF evaluated value signal S8 loaded at Step S110 of the current routine.

Next, at Step S114, the microcomputer 9 compares the AF evaluated value of the current routine with the AF evaluated value of the last routine and determines whether or not the difference (the variation) is larger than a predetermined value. If the difference is larger than the predetermined value, the microcomputer 9 returns to Step S101 to perform "the minimal drive control". On the other hand, if the difference is smaller than the predetermined value, the focus lens is in the in-focus state. Therefore, the microcomputer 9 outputs a control signal for stopping the operation of the focus lens as the output signal S9. This operation is repeated until the variation of the AF evaluated value is larger than the predetermined value.

As described above, in this embodiment, if the second unit image that has a low S/N ratio has been obtained by the flicker correction (the amplification process) for the first unit image that has a low luminance level, the AF evaluated value based on the second unit image is not used for the focus control. Conversely, the focus control is performed using only the AF evaluated value based on the second unit image with a high S/N ratio or high reliability. Therefore, in the image pickup apparatus using the image pickup device that can read at high speed, a fine AF control can be performed even if the flicker of the light source exists.

For more detail, the image pickup apparatus does not use the AF evaluated value based on the image in which the S/N ratio has been lowered by the flicker correction among the AF evaluated values sequentially obtained by reading signals at high speed from the image pickup device. Instead, it uses only the AF evaluated value based on the image in which the S/N ratio is fine. In this case, because the generation cycle of the AF evaluated value is extremely short in accordance with the high speed read cycle of the image pickup device, a fine AF characteristic can be achieved even if the AF evaluated value based on the image in which the S/N ratio has been lowered is not used.

Embodiment 2

Figure 4:
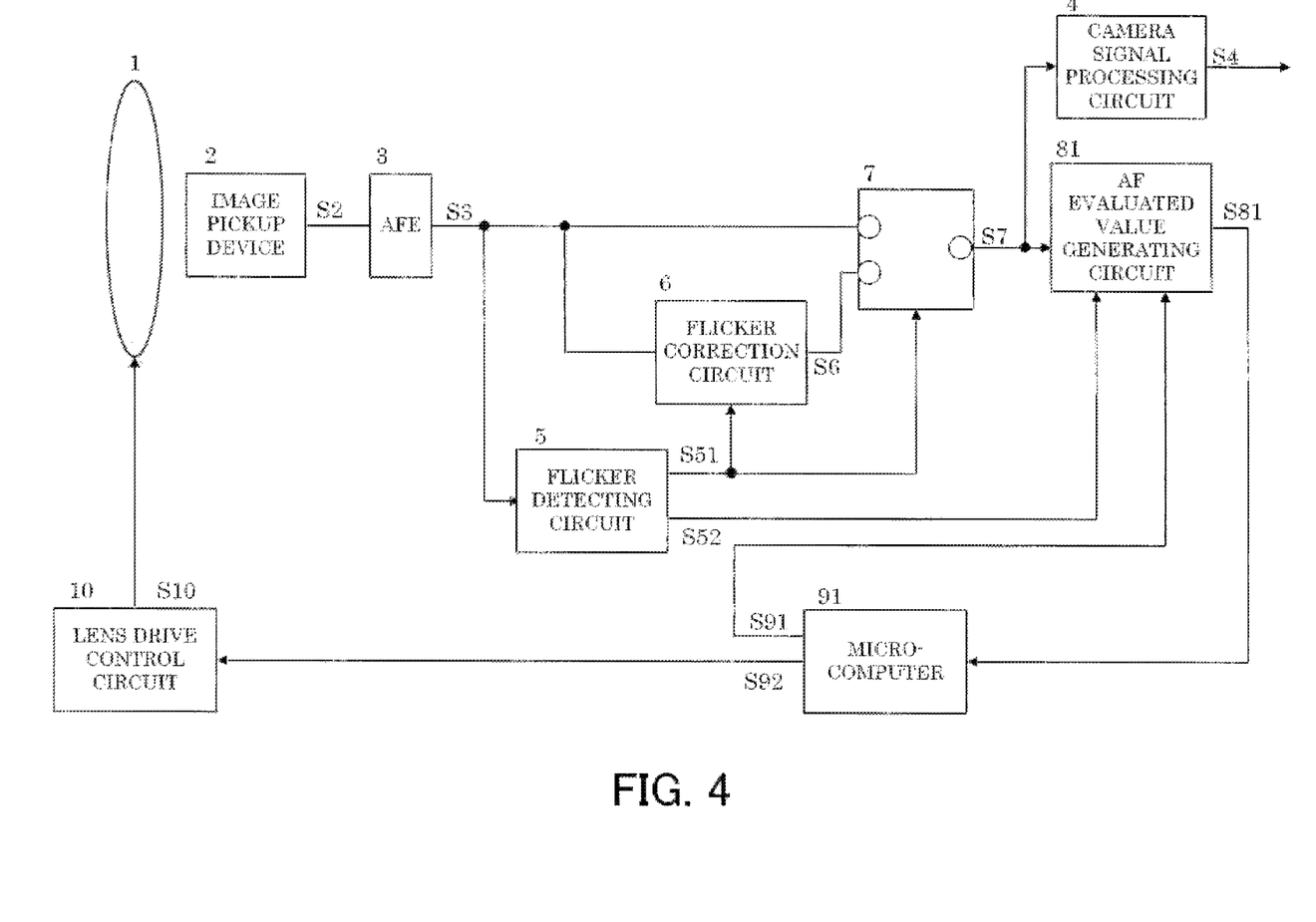
FIG. 4 is a block diagram showing the configuration of an image pickup apparatus that is Embodiment 2 of the present invention.

FIG. 4 shows the configuration of an image pickup apparatus that is Embodiment 2 of the present invention. In FIG. 4, the same elements as those of Embodiment 1 (FIG. 1) are represented by the same symbols as those of Embodiment 1 and the explanation for the elements in this embodiment is omitted.

In this embodiment, the operations of an AF evaluated value generating circuit 81 and a microcomputer 91 are different from those of the AF evaluated value generating circuit 8 and the microcomputer 9, respectively. Therefore, the explanation in this embodiment is focused on these operations. The AF evaluated value generating circuit 81 and the microcomputer 91 constitute a controller also in this embodiment.

The AF evaluated value generating circuit 81 inputs the output signal S7 from the selector 7, the output signal S52 from the flicker detecting circuit 5, and an output signal S91 from the microcomputer 91. The AF evaluated value generating circuit 81 generates the AF evaluated value signal based on the first unit image (if the flicker does not exist) or the second unit image (if the flicker exists) inputted as the output signal S7 from the selector 7 to output it as the output signal S8 in the following case.

In the AF evaluated value generating circuit 81, when the output signal (the use/nonuse information) S52 from the flicker detecting circuit 5 is 1, it means that the flicker does not exist or the gain of the flicker correction (the amplification process) is smaller than a predetermined value and the S/N ratio of the second unit image is high. In this case, the AF evaluated value generating circuit 81 stores the AF evaluation signal represented by the generated AF evaluated value signal in a memory (not shown).

On the other hand, when the output signal S52 of the flicker detecting circuit 5 is 0, it means that the gain of the flicker correction (the amplification process) is larger than the predetermined value and that the S/N ratio of the second unit image is low. In this case, the AF evaluated value generating circuit 81 does not generate the AF evaluation signal. In other words, the microcomputer 91 does not use the AF evaluated value signal based on the second unit image for the AF control.

In this case, the AF evaluated value generating circuit 81 reads the AF evaluated value stored in the last AF control routine from the memory in accordance with the output signal S91 which shows the AF control state from the microcomputer 91. The AF evaluated value generating circuit 81 generates the AF evaluated value in accordance with the AF evaluated value and the AF control state and outputs it as the output signal S81. The outputted AF evaluated value is stored in the memory.

Figure 5:
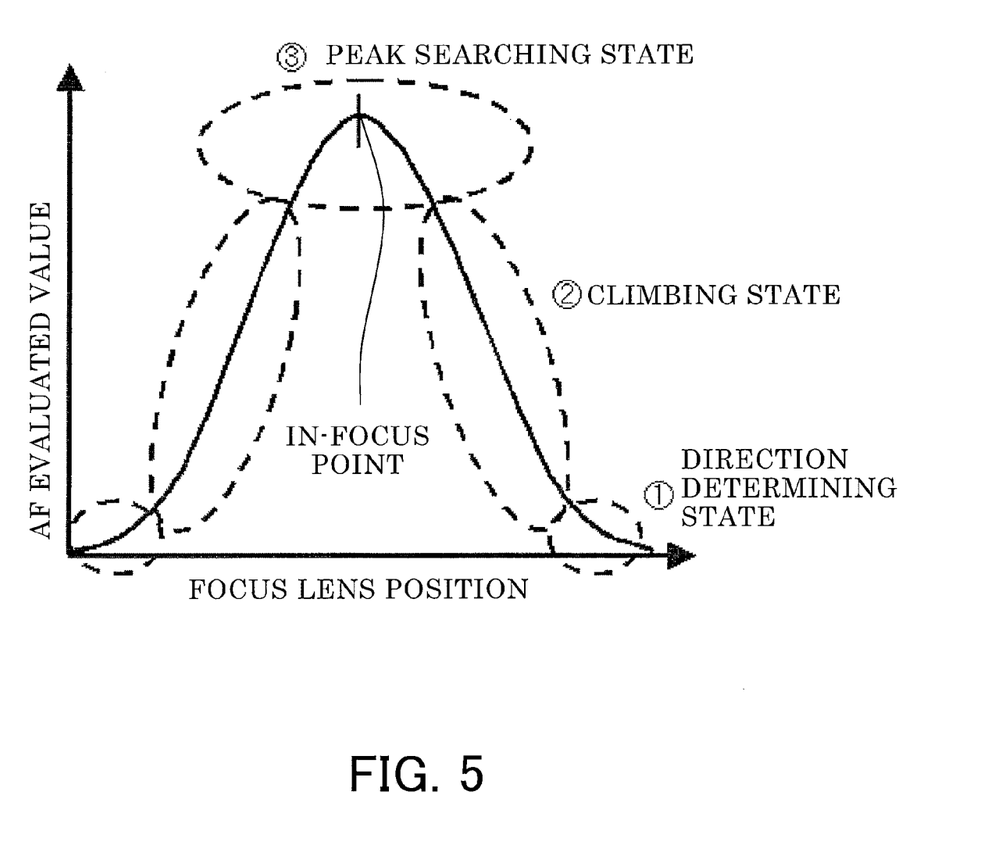
FIG. 5 is a diagram showing the AF control state in Embodiment 2.

FIG. 5 shows the AF control state. The vertical axis indicates the AF evaluated value and the lateral axis indicates the focus lens position.

The AF control state has three states that are a "direction determining state", a "climbing state", and a "peak searching state". When the output signal S91 from the microcomputer 91 shows the "direction determining state", it means the microcomputer 91 performs the "minimal drive control" of the focus lens. In this case, the AF evaluated value generating circuit 81 reads the AF evaluation value stored in the memory in the last routine and outputs it as the output signal S81.

When the output signal S91 from the microcomputer 91 shows the "climbing state", it means the focus lens continues to move in one direction. In this case, the AF evaluated value generating circuit 81 reads the AF evaluated values obtained in the last two routines from the memory. Then, the AF evaluated value generating circuit 81 adds the difference value between the AF evaluated value of the second last AF evaluated value and the last AF evaluated value to the last AF evaluated value. The AF evaluated value generating circuit 81 outputs the output signal S81 that is the added result as the AF evaluated value in the current routine.

When the output signal S91 from the microcomputer 9 shows the "peak searching state", as in the case of the "direction determining state", the focus lens repeats the minimal drive. Therefore, the AF evaluated value generating circuit 81 reads the AF evaluated value of the last routine from the memory to output it as the output signal S81.

The microcomputer 91 outputs the control signal S92 for the AF control to the lens drive control circuit 10 based on the output signal (the AF evaluated value) S81 from the AF evaluated value generating circuit 81.

Figure 6:
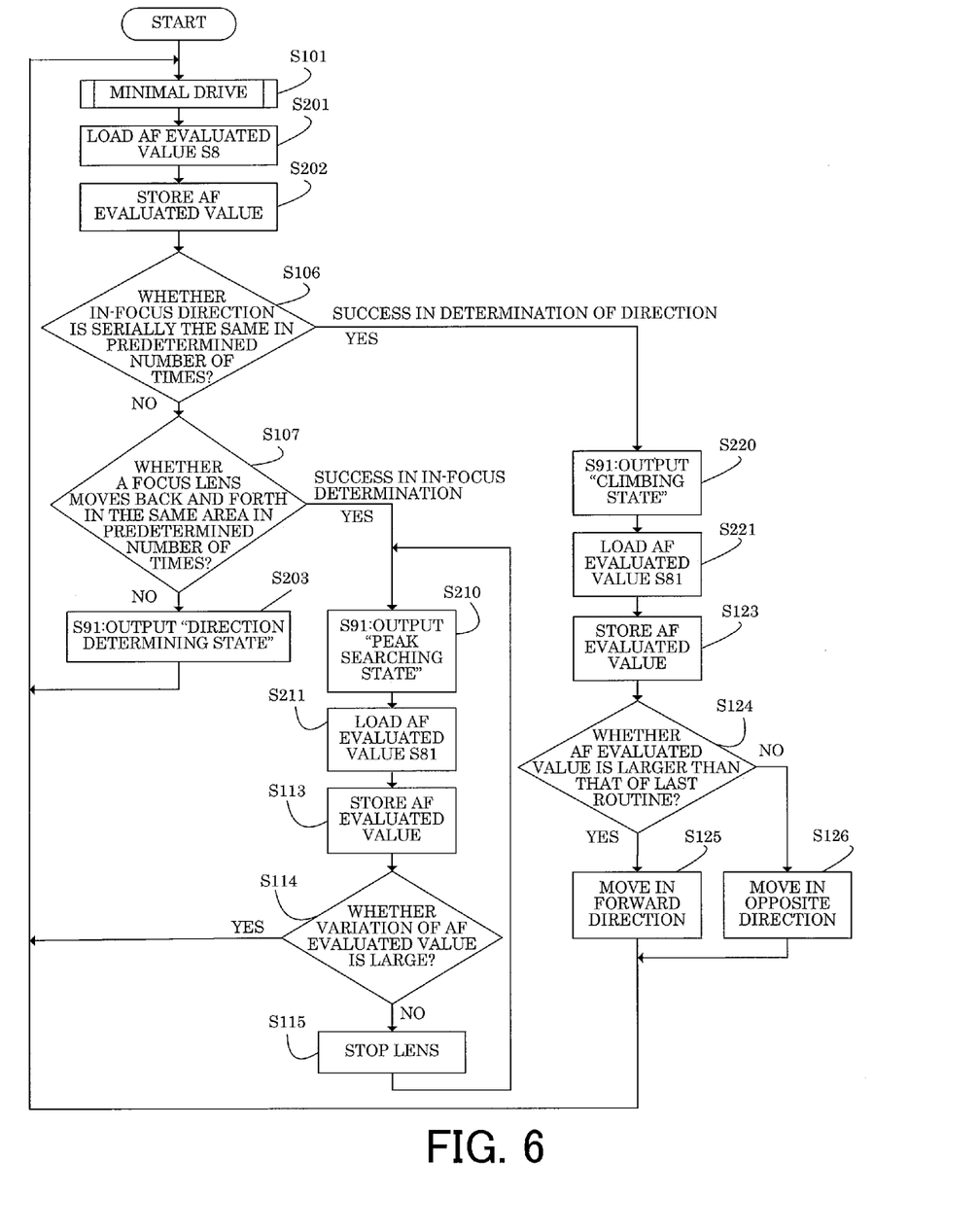
FIG. 6 is a flowchart of the AF control by a control apparatus of Embodiment 2.

FIG. 6 shows a flowchart of the AF control of the microcomputer 91 in this embodiment. In the steps of FIG. 6, the same steps as those of Embodiment 1 (FIG. 3) are represented by the same symbols as those of Embodiment 1 and the explanation for the steps is omitted in this embodiment.

After Step S101, the microcomputer 91 loads the output signal (the AF evaluated value) S81 from the AF evaluated value generating circuit 81 at Step S201 and stores it in the memory at Step S202. Then, the microcomputer 91 determines whether or not it has succeeded in determining the in-focus direction at Step S106 and has succeeded in the in-focus determination at Step S107. If the microcomputer 91 has not succeeded in neither the in-focus direction nor the in-focus determination, it outputs the output signal S91 showing the "direction determining state" at Step S203.

If the microcomputer 91 has succeeded in determining the in-focus direction at Step S106, proceeding to Step S220, it outputs the output signal S91 showing the "climbing state" in order to perform the "climbing control".

Then, the microcomputer 91 loads the output signal (the AF evaluated value) S81 from the AF evaluated value generating circuit 81 at Step S221, and stores the AF evaluated value in the memory at Step S123.

Following this, the microcomputer 91 performs the processes of Steps S124 and S125 or S126, and returns to Step S101. In this embodiment, the output signal from the microcomputer 91 at Steps S125 and S126 is the control signal S92. The content of the signal is the same as that of the control signal S9 in Embodiment 1. The same applies to Step S115 described later.

If the microcomputer 91 has succeeded in the in-focus determination at Step S107, proceeding to Step S210, it outputs the output signal S91 showing the "peak searching state". Then, the microcomputer 91 loads the output signal (the AF evaluated value) S81 of the AF evaluated value generating circuit 81 at Step S211 and stores the AF evaluated value in the memory at Step S113.

The microcomputer 91 returns either to Step S101 through Steps S113 and S114 or to Step S210 through Steps S113, S114 and S115.

In this embodiment, as in the case of Embodiment 1, if the second unit image with a low S/N ratio has been obtained by the flicker correction (the amplification process) for the first unit image with a low luminance level, the microcomputer 91 does not use the AF evaluated value based on the second unit image for the focus control. Conversely, the focus control is performed using only the AF evaluated value based on the second unit image with a high S/N ratio or high reliability. Therefore, in the image pickup apparatus using the image pickup device that can read at high speed, a fine AF control can be performed even if the flicker of the light source exists.

According to the above embodiments, when the luminance variation in the plurality of the first unit images exists, the image pickup apparatus performs the focus control using the second unit image generated from the first unit image with a luminance that is higher than a predetermined value, in other words, using the focus evaluation signal generated based on the image that has a fine S/N ratio. Therefore, a focus control (a contrast AF) with high accuracy can be performed by the image pickup apparatus using the image pickup device that can read at high speed.

Since each of the embodiments described above is only a representative example of the present invention, it can be variously changed or modified in the practice of the present invention.

This application claims foreign priority benefits based on Japanese Patent Application No. 2007-153506, filed on Jun. 11, 2007, which is hereby incorporated by reference herein in its entirety as if fully set forth herein.

What is claimed is:

1. An image pickup apparatus comprising:
an image pickup device that photoelectrically converts an image of an object;
a first image generator that generates a first image based on a signal read from the image pickup device in each read cycle of the signal, the signal read in a cycle shorter than a cycle of a flicker of a light source illuminating the object;
a detector that detects a luminance of the first image and detects a luminance variation in a plurality of the first images;
a second image generator that generates a second image by amplifying the first image in accordance with the luminance so as to reduce the luminance variation when the detector detects the luminance variation; and
a controller that generates a focus evaluation signal based on the second image to perform a focus control using the focus evaluation signal,
wherein, when the focus control is performed using the focus evaluation signal based on the second image, the controller does not use the focus evaluation signal based on the second image generated from the first image in which the luminance is lower than a predetermined luminance for the focus control, and the controller uses the focus evaluation signal based on the second image generated from the first image in which the luminance is higher than the predetermined luminance for the focus control.

2. The image pickup apparatus according to claim 1, wherein the luminance variation occurs in a cycle, and wherein the cycle of the luminance variation is longer than a read cycle of a signal from the image pickup device.

3. The image pickup apparatus according to claim 2, wherein the cycle of the luminance variation is the cycle of the flicker of the light source illuminating the object.

4. A focus control method comprising:
a first image generation step of generating a first image based on a signal read from an image pickup device photoelectrically converting an image of an object-in each read cycle of the signal, the signal read in a cycle shorter than a cycle of a flicker of a light source illuminating the object;
a detection step of detecting a luminance of the first image and that detects a luminance variation in a plurality of the first images;
a second image generation step of generating a second image by amplifying the first image in accordance with the luminance so as to reduce the luminance variation when the detector detects the luminance variation; and
a control step of generating a focus evaluation signal based on the second image to perform a focus control using the focus evaluation signal,
wherein in the control step, when the focus control is performed using the focus evaluation signal based on the second image, the focus evaluation signal based on the second image generated from the first image in which the luminance is lower than a predetermined luminance is not used for the focus control, and the focus evaluation signal based on the second image generated from the first image in which the luminance is higher than the predetermined luminance is used for the focus control.

5. An image pickup apparatus comprising:
a first image generator that generates a first image in a cycle shorter than a cycle of a flicker of a light source illuminating an object;
a detector that detects a luminance of the first image and detects a luminance variation with a cycle of a flicker in a plurality of the first images;
a second image generator that generates a second image by performing a correction processing in accordance with a gain depending on a luminance of the first image so as to reduce the luminance variation;
a controller that generates a focus evaluation signal based on the second image to perform a focus control using the focus evaluation signal,
wherein, when the focus control is performed using the focus evaluation signal based on the second image, the controller does not use the focus evaluation signal based on the second image generated from the first image in which the gain is larger than a predetermined value for the focus control, and the controller uses the focus evaluation signal based on the second image generated from the first image in which the gain is lower than the predetermined value for the focus control.

6. A focus control method comprising:
a first image generation step of generating a first image in a cycle shorter than a cycle of a flicker of a light source illuminating an object;
a detection step of detecting a luminance of the first image and detecting a luminance variation with a cycle of a flicker in a plurality of the first images;
a second image generation step of generating a second image by performing a correction processing in accordance with a gain depending on a luminance of the first image so as to reduce the luminance variation;
a control step of generating a focus evaluation signal based on the second image to perform a focus control using the focus evaluation signal,
wherein in the control step, when the focus control is performed using the focus evaluation signal based on the second image, the focus evaluation signal based on the second image generated from the first image in which the gain is larger than a predetermined value is not used for the focus control, and the focus evaluation signal based on the second image generated from the first image in which gain is lower than the predetermined value is used for the focus control.

* * * * *